(12) United States Patent
Bee

(10) Patent No.: US 9,643,523 B2
(45) Date of Patent: May 9, 2017

(54) PORTABLE SEAT PROTECTOR

(71) Applicant: Barbara Bee, Riverside, CA (US)

(72) Inventor: Barbara Bee, Riverside, CA (US)

(*) Notice: Subject to any disclaimer, the term of this patent is extended or adjusted under 35 U.S.C. 154(b) by 170 days.

(21) Appl. No.: 14/507,837

(22) Filed: Oct. 7, 2014

(65) Prior Publication Data
US 2015/0097402 A1 Apr. 9, 2015

Related U.S. Application Data

(60) Provisional application No. 61/887,642, filed on Oct. 7, 2013.

(51) Int. Cl.
B60N 2/60 (2006.01)
A47C 31/11 (2006.01)

(52) U.S. Cl.
CPC .......... B60N 2/6018 (2013.01); A47C 31/113 (2013.01)

(58) Field of Classification Search
None
See application file for complete search history.

(56) References Cited

U.S. PATENT DOCUMENTS

| | | | | |
|---|---|---|---|---|
| 5,806,925 A * | 9/1998 | Hanley | ............... | A47C 31/113 297/219.1 |
| 6,164,726 A * | 12/2000 | Reeves | ............... | A47C 1/146 297/16.2 |
| 6,338,527 B1 * | 1/2002 | Toyota | ............... | B60N 2/6054 297/219.1 |
| 6,382,720 B1 | 5/2002 | Franklin | | |
| 6,655,736 B1 | 12/2003 | Arenas | | |
| 6,659,551 B1 * | 12/2003 | Arenas | ............... | B60N 2/6063 160/23.1 |
| 6,764,134 B1 * | 7/2004 | Crescenzi | ............. | A47C 31/00 2/69 |
| 7,000,984 B1 * | 2/2006 | Ward | ............... | A47C 31/113 297/188.2 |
| 7,175,231 B2 * | 2/2007 | Gallo | ............... | A47C 7/38 297/218.1 |
| 7,210,738 B1 * | 5/2007 | Mahaffy | ............... | B60N 2/60 297/184.1 |
| 7,247,360 B1 * | 7/2007 | Besner | ............... | A47K 13/16 4/245.1 |
| 7,461,894 B2 * | 12/2008 | Leeds | ............... | A45C 3/00 297/219.1 |
| 8,613,114 B1 * | 12/2013 | Olivares Velasco | ... | A42B 3/125 2/171 |

(Continued)

FOREIGN PATENT DOCUMENTS

JP 06197826 A * 7/1994

*Primary Examiner* — David E Allred
(74) *Attorney, Agent, or Firm* — Ascus IP Law, PC; Colin D. Rasmussen

(57) ABSTRACT

A portable seat protector comprises a flexible cover portion that can be deployed over a seating surface, for example a seat in a motor vehicle. The protector includes mounting straps designed to secure the protector to a car seat headrest either when in use or when not in use. Storage straps secure the protector in a rolled up configuration when not in use. The cover can be made from materials that prevent moisture, oils or soil from being transferred from the user to the seating surface. The cover may optionally include multiple layers including materials that wick moisture from the user while still protecting the seating surface.

10 Claims, 2 Drawing Sheets

(56) References Cited

U.S. PATENT DOCUMENTS

| | | | | |
|---|---|---|---|---|
| 2007/0234480 A1* | 10/2007 | Crousore | ............ | A61G 7/05769 5/706 |
| 2009/0108650 A1* | 4/2009 | Ditwiler | ................... | B60N 2/60 297/219.1 |
| 2014/0338228 A1* | 11/2014 | Rolle | ..................... | A43C 19/00 36/109 |
| 2016/0184154 A1* | 6/2016 | Lafleche | ................ | A61G 7/057 5/81.1 T |

* cited by examiner

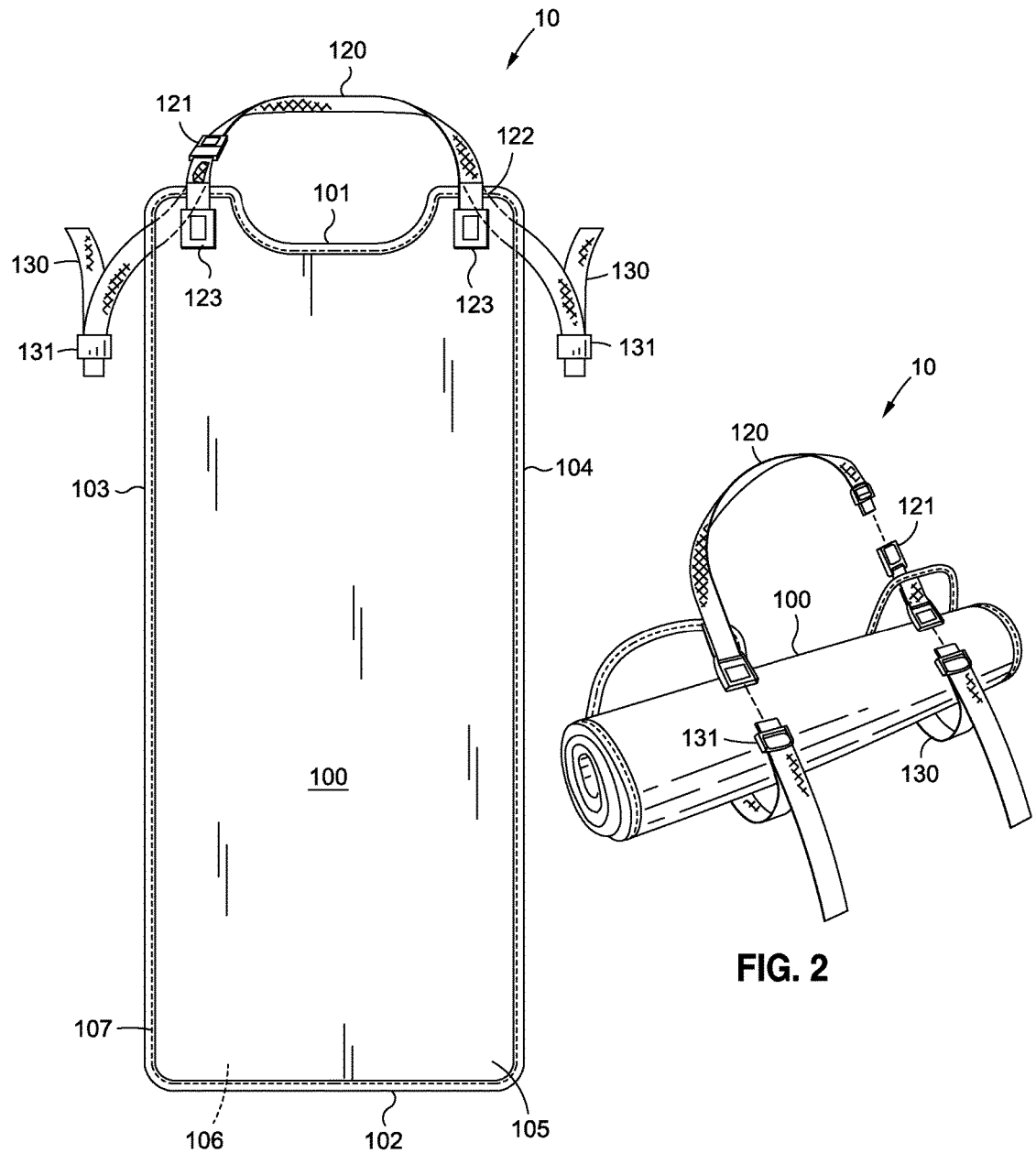

PORTABLE SEAT PROTECTOR

CROSS REFERENCE TO RELATED APPLICATIONS

This application claims the benefit under 35 U.S.C. §119 (e) of U.S. Provisional Application No. 61/887,642, filed Oct. 7, 2013, and entitled "Portable Seat Cover", the entirety of which is hereby incorporated by reference.

FIELD OF THE INVENTION

The field of the invention relates to seat covers and in particular a portable seat cover for automobile seats that are readily deployable and simple to store when not in use.

BACKGROUND

It is inevitable that over time seating areas, for example car seats get soiled. As is well known moisture, dirt and other materials on person can over time accumulate on a seat surface, impairing its aesthetic look, and even potentially resulting in unpleasant odors. This can especially be a problem for people who are active in sports, aerobics, and other activities who generally may have accumulated dirt from a playing field, or otherwise continue to perspire for a period of time after the end of the activity. For those people, getting into a car seat immediately after an activity can contribute significantly to the soiling of the seat surface.

There are a number of seat covers available on the market. However, many of them are limited in that they are either overly complicated, difficult to install, and/or inconvenient to store.

For example U.S. Pat. No. 7,210,738 (Mahaffy) describes a retractable seat back cover to prevent occupants of a rear seat in a vehicle from soiling the backside of a car seat.

U.S. Pat. Nos. 6,655,736 and 6,659,551 (Arenas) describe a retractable seat cushion and back cover system that is stowed underneath the front seat and can be pulled out to cover the seat prior to the occupant taking their place.

U.S. Pat. No. 6,382,720 (Franklin) also describes a retractable seat cover system that is mounted on the front of the car seat and which can be pulled out for deployment over a car seat cushion and back.

Each of these prior art examples suffers from notable limitations. First, each is relatively permanently mounted to the car seat. As a result, they lack the convenience of portability such that one effectively has to buy a seat cover system for each seat to be covered.

Similarly, they are all generally based on a concept analogous to a window blind, where the cover can be retracted into a housing when not in use, and then withdrawn from the housing when needed. In most people's experience with window blind mechanisms, they are not particularly convenient to operate, and the existence of a roller mechanism simply provides one more point of failure for the product, rendering it effectively unusable.

As well, none of these systems are particularly amenable to cleaning, so in effect the problem of soiling the car seat is not actually resolved, it is just a different installed component that accumulates the dirt, moisture and other undesirable constituents.

SUMMARY OF THE INVENTION

Various objects, features, aspects and advantages of the inventive subject matter will become more apparent from the following detailed description of preferred embodiments, along with the accompanying drawing figures in which like numerals represent like components.

The present disclosure provides a portable protective cover. The cover generally comprises a flexible sheet that can be placed over a seating area, for example over a car seat. Conveniently, the cover can comprise a flexible sheet that is able to conform both to the shape of the seat as well as to the body of the user, when in use. In some cases the cover can be made from moisture-resistant or moisture-proof material to prevent moisture, oils, or soil from being transferred from the body of the user to the seat.

The cover also includes a convenient means for securing the cover to the seat, as well as a means of storage when not in use. When deployed, a mounting strap, or straps, at the upper end of the cover can be used to hang the cover from the mounting posts of a vehicle seat headrest. When not in use, the cover can be rolled up and a storage strap or straps are used to keep the cover in the rolled up configuration. When rolled up, the mounting strap or straps are used to also hang the cover from the headrest, and in this case the cover can hang from the back of the headrest so as not to bother the user when the cover is not needed.

The cover and other components can be conveniently made from washable materials so that the entire apparatus can be cleaned as needed. In addition, the cover can be made of more than one layer. In some cases, one layer will be moisture-resistant or moisture proof in order to protect the seating area. In some cases, the cover can include a second layer, for example a layer of moisture wicking material to draw moisture from the user while still preventing the transfer of moisture from the user to the seat itself.

Thus, there is provided in the present disclosure, a portable seat protector for providing temporary protection to a seating surface, comprising: a flexible cover portion comprising an upper end, a lower end, a left edge a right edge, a top surface and a bottom surface; at least one mounting strap, the at least one mounting strap further comprising a first end and second end; wherein each of the first end and second end of the at least one mounting strap are reversibly attach to the cover portion at the upper end end; wherein the at least one mounting strap is configured to reversibly secure the seat protector to a headrest of a seat in a vehicle; at least one storage strap, configured to secure the seat protector in the storage configuration when the seat protector is not in use; wherein the cover portion is moveable between a storage configuration and a deployed configuration by a user.

In some embodiments, the flexible cover portion comprises a first layer of material, the first layer effective to prevent moisture carried by a user from contacting the seating surface. In some embodiments, the first layer comprises at least one of plastic or neoprene. In some embodiments, the first layer of material is textured such that the seat protector clings to the seating surface when the seat protector is in use.

In some embodiments, the flexible cover portion further comprises a second layer of material, the second layer effective to wick moisture away from the user. In some embodiments, when the seat protector is in use the first layer is oriented towards the seating surface, and the second layer is oriented towards the user.

In some embodiments, the flexible cover portion comprises a material with anti-microbial properties effective to inhibit the growth of microbes. In some embodiments, the flexible cover portion further comprises a deodorizing compound.

In some embodiments, in the deployed configuration the flexible cover portion covers substantially the entire seating surface. In some embodiments, in the storage confirmation, the flexible cover is rolled up and placed behind the headrest.

BRIEF DESCRIPTION OF THE DRAWINGS

While the invention is claims in the concluding portions hereof, preferred embodiments are provided in the accompanying detailed description which may be best understood in conjunction with the accompanying diagrams where like parts in each of the several diagrams are labeled with like numerals, and where:

FIG. 1 depicts an embodiment of a portable seat cover.

FIG. 2 depicts an embodiment of a portable seat cover rolled up in preparation for storage.

DETAILED DESCRIPTION

Figure 3:
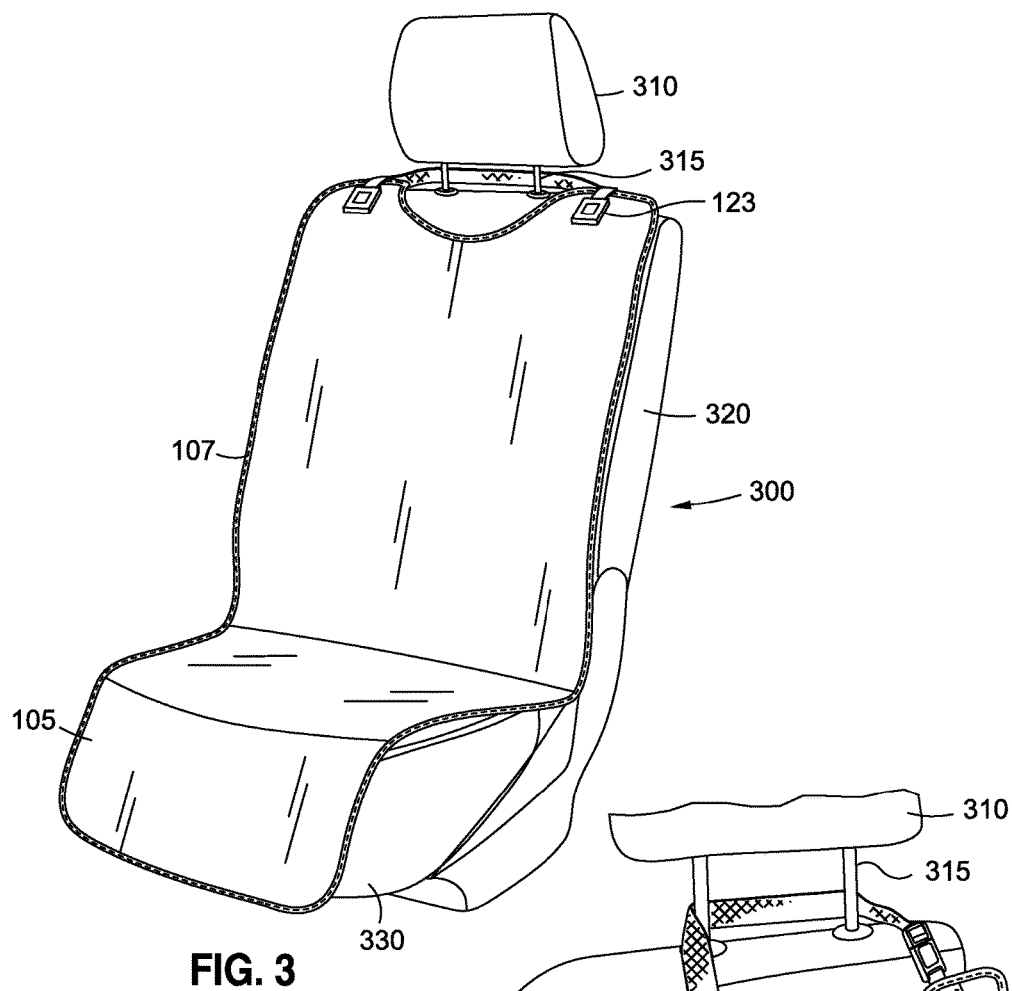
FIG. 3 depicts an embodiment of a portable seat cover in use to cover a car seat.

The following discussion provides examples of embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed. Those of skill in the art will recognize that the described embodiment are examples of possible configurations of the invention, and are not intended to be limiting to the scope of the invention. Accordingly, the drawings and descriptions contained herein are to be regarded as illustrative of the invention as set forth in the accompanying claims.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

There is currently increasing interest in personal fitness, exercise and participation in sports. Frequently, facilities do not exist for people to change out of clothes worn during exercise before getting in their vehicle. Over time this poses a problem as moisture generated during exercise, body oils, and soil can be transferred to the vehicle seat. Over time, because of the nature of sweat, oils and soil, this can lead to visibly soiled vehicle seats, as well as the generation of odors. While there are attempts at producing seat covers as described above, most of the currently available covers are either difficult to install, or otherwise inconvenient to use. The present invention takes a much simpler approach to fulfill the need of consumers who wish to have an easy-to-use and portable car seat cover that can be easily deployed or stored, and which can be used by an individual rather than existing generic covers which are not configured for personal use.

As shown in FIG. 1, the present disclosure provides a portable seat protector 10 system that can be used to provide temporary protection to a seating surface, for example a car seat 300 in a motor vehicle. In an exemplary embodiment, the cover comprises a flexible cover portion 100 having an upper end 101, lower end 102, left edge 103, a right edge 104, a top surface 105, a bottom surface 106. The cover may optionally include edging 107, for example piping that is frequently used to finish edges of clothing and other manufactured goods. Conveniently, the edging 107 may be provided in a number of different colors, so that an individual could readily identify their personal seat protector by reference to the edging color. Similarly, the seat protector might also be embroidered with a person's name, again to allow for ready identification of a person's own seat protector. One particular advantage of the current protector over prior art devices is the fact that each person in a vehicle can have their own protector since the device is readily movable and deployable from one seat to another rather than being generically placed on a seat as with other designs.

The seat protector further comprises mounting straps 120 and storage straps 130, as depicted in the figures. Each end of the mounting strap is attached to the cover 100 by a strap attachment 122. The strap attachment may be permanent (e.g., sewn to the cover) or reversible (e.g., a snap mechanism). Where a snap is used, the mounting strap could be conveniently removed from the cover. For example, if a strap were to become damaged, it could be replaced without requiring the user to purchase an entirely new seat protector system. For ease of mounting to the headrest 310 of a car seat, the mounting strap may also include a detachable snap 121. It will be readily apparent that to hang the protector from the headrest, one would unhook snap 121, place the mounting strap around the headrest (See for example, FIG. 4), and then reconnect the snap 121. The protector would then hang securely from the headrest. As shown, in some cases, the protector can be hung form the headrest mounting posts 315.

Figure 4:
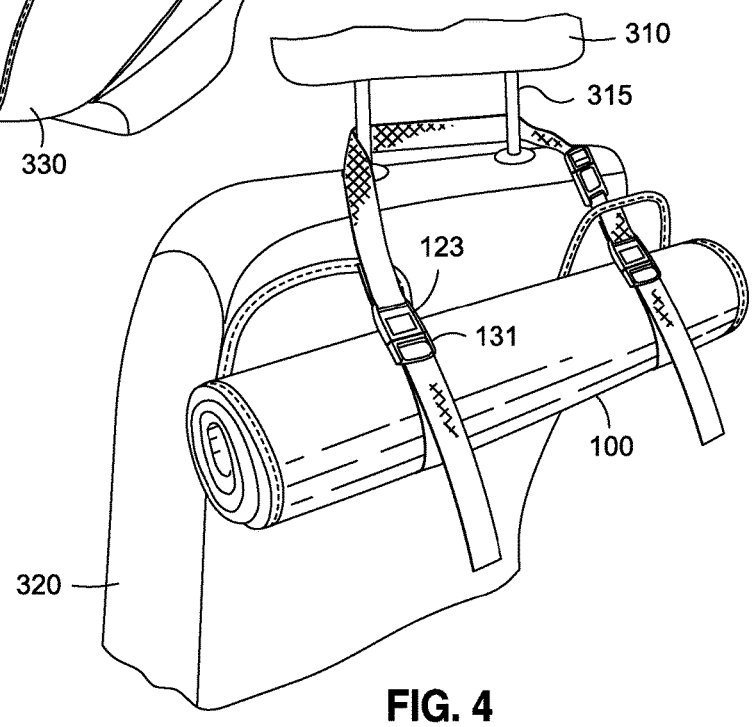
FIG. 4 depicts an embodiment of a portable seat cover rolled up and secured for storage when not in use.

As noted above, the protector can also include storage straps 130, which can be used to keep the cover in a rolled up configuration when not in use (See for example FIGS. 2 and 4). Conveniently, when the protector is not required it can be rolled up and secure by wrapping the storage straps around the cover 100. In one embodiment, the storage straps 130 include snaps 131 that can engage into receiving ends 123 of the mounting strap attachment 122. As a result, the protector can be rolled up and maintained in a rolled up storage configuration by engaging the snaps 131 into the receiving ends 123, and then hanging the entire protector from the headrest or a car seat back 320, as depicted in FIG. 4. The straps may also be made to be adjustable in length so that the protector could be hung loosely, or tightly from the headrest as desired.

As shown in FIG. 3, when in use, the protector can be unrolled and extend out over the vehicle seat 300 such that it covers substantially the entire seating surface, including the seat back 320 and seat 330. Since the cover comprises a flexible material, it will naturally conform to the shape of the seating surface and the contours of the user's body simply by the weight of the user when seated.

In some embodiments, the cover can be made of a single layer of material that is effective to protect the seating surface from moisture, oils and soil. In other embodiments it may be desirable to make a protector that comprises multiple layers of material, each layer having specific properties. For example, in some embodiments, the bottom surface (that which would normally be in direct contact with the seating surface) could comprise a moisture resistant or moisture proof material to protect the sweat or other sources of water such as wet clothing. In this case, the top layer might be selected from a material with moisture wicking properties in order to draw moisture from the body or clothing of the user, while still protecting the seating surface from the same. As can be readily understood, this wicking layer would normally be in direct contact with the user.

The specific type of material for the moisture resistant layer can include such things as plastics, rubberized cloth, neoprene, and the like. Moisture wicking materials are well known in the clothing arts and can include such materials as polyester cloths designed to have wicking properties. These example of materials are not meant to be limiting to the scope of the claims, and as such any material effective to provide a moisture barrier and/or wicking properties are intended to be within the scope of the claims that follow. In some cases it may also be desirable for the bottom surface to be textured in order to better prevent the seat protector from slipping when in use.

It may also be desirable to treat the materials used in constructing the seat protector with various additional compounds. For example, it will be possible to either pre-treat, or treat from time to time with compounds such as anti-microbial agents, deodorants and the like in order to inhibit the growth of bacteria or other micro-organisms, and to limit unpleasant odors. In some cases, the material selected for use in the protector can be washable, so that the entire system can be cleaned from time to time in a regular household washing machine. It might also be desired to treat with commercially available dirt and stain repellant treatments such as Scotchgard® and the like.

It should also be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A portable seat protector for providing temporary protection to a seating surface, comprising:
   a flexible cover portion comprising an upper end, a lower end, a left edge a right edge, a top surface and a bottom surface, the flexible cover portion configured to be moveable between a storage configuration and a deployed configuration;
   at least one mounting strap, the at least one mounting strap further comprising a first end and second end;
      wherein each of the first end and second end of the at least one mounting strap are releasably attached to the flexible cover portion at the upper end;
      wherein the at least one mounting strap is configured to form a closed loop with the upper end of the flexible cover and to removably secure the seat protector to a headrest of a seat in a vehicle;
   at least one storage strap, the at least one storage strap attached to the flexible cover at the upper end at or adjacent to the attachment of the mounting strap to the flexible cover comprising an engagement structure configured to releasably engage a complimentary structure located on an end of the at least one mounting strap;
   wherein when the engagement structure is engaged, the flexible cover portion can be maintained in the storage configuration, and when the engagement structure is disengaged, the flexible cover portion can be moved to the deployed configuration.

2. The seat protector of claim 1, wherein the flexible cover portion comprises a first layer of material, the first layer effective to prevent moisture carried by a user from contacting the seating surface.

3. The seat protector of claim 1, wherein the first layer comprises at least one of plastic or neoprene.

4. The seat protector of claim 1, wherein the first layer of material is textured such that the seat protector clings to the seating surface when the seat protector is in use.

5. The seat protector of claim 1, wherein the flexible cover portion further comprises a second layer of material, the second layer effective to wick moisture away from the user.

6. The seat protector of claim 5, wherein when the seat protector is in use the first layer is oriented towards the seating surface, and the second layer is oriented towards the user.

7. The seat protector of claim 1, wherein the flexible cover portion comprises a material with anti-microbial properties effective to inhibit the growth of microbes.

8. The seat protector of claim 1, wherein the flexible cover portion further comprises a deodorizing compound.

9. The seat protector of claim 1, wherein when in the deployed configuration the flexible cover portion covers substantially the entire seating surface.

10. The seat protector of claim 1, wherein when in the storage configuration, the flexible cover is rolled up and placed behind the headrest.

* * * * *